United States Patent [19]
Kent et al.

[11] 4,082,489
[45] Apr. 4, 1978

[54] PIVOT ARRANGEMENT FOR A ROTARY DRUM ASSEMBLY

[75] Inventors: Harry James Kent, Pittsburgh; Arthur Jacob Pietrusza, McMurray, both of Pa.

[73] Assignee: Dravo Corporation, Pittsburgh, Pa.

[21] Appl. No.: 709,418

[22] Filed: Jul. 28, 1976

[51] Int. Cl.² .............................................. B01J 2/12
[52] U.S. Cl. .................................... 425/222; 432/106; 23/313 R
[58] Field of Search ....................... 425/222; 264/117; 23/313 R; 432/106

[56] References Cited
U.S. PATENT DOCUMENTS

| 2,979,421 | 4/1961 | Rissman et al. ................ 425/222 X |
| 3,116,055 | 12/1963 | Pixley et al. .......................... 432/106 |

FOREIGN PATENT DOCUMENTS

| 2,006,503 | 8/1971 | Germany .............................. 425/222 |
| 388,745 | 2/1933 | United Kingdom ................. 432/106 |

Primary Examiner—Robert D. Baldwin
Attorney, Agent, or Firm—Stanley J. Price, Jr.; John M. Adams

[57] ABSTRACT

A first cylindrical drum member is rotatably supported on a platform assembly and has a longitudinal axis that is coplanarly aligned with the longitudinal axis of a second cylindrical drum member that is supported independently of the first drum member and positioned in tandem relation thereto. The first drum member has an inlet end portion through which a pair of feed screw conveyors extend to supply agglomerative materials, such as preheated coal and char, to the inner portion of the first drum member. An outlet portion of the first drum member extends into the inlet portion of the second drum member. A platform assembly is provided that includes a pair of vertically extending leg portions through which a pair of shafts transversely extend to permit pivoting the first drum member. The longitudinal axes of the respective drum members intersect at the transverse axis formed by the shafts so that the platform assembly is arranged to pivot about the intersection of the respective longitudinal axes. The platform assembly includes a frame member that is mounted on a plurality of jack devices that are operable to raise and lower the frame about the outlet of the first drum member and thereby adjust the slope of the first drum member relative to the second drum member.

4 Claims, 3 Drawing Figures

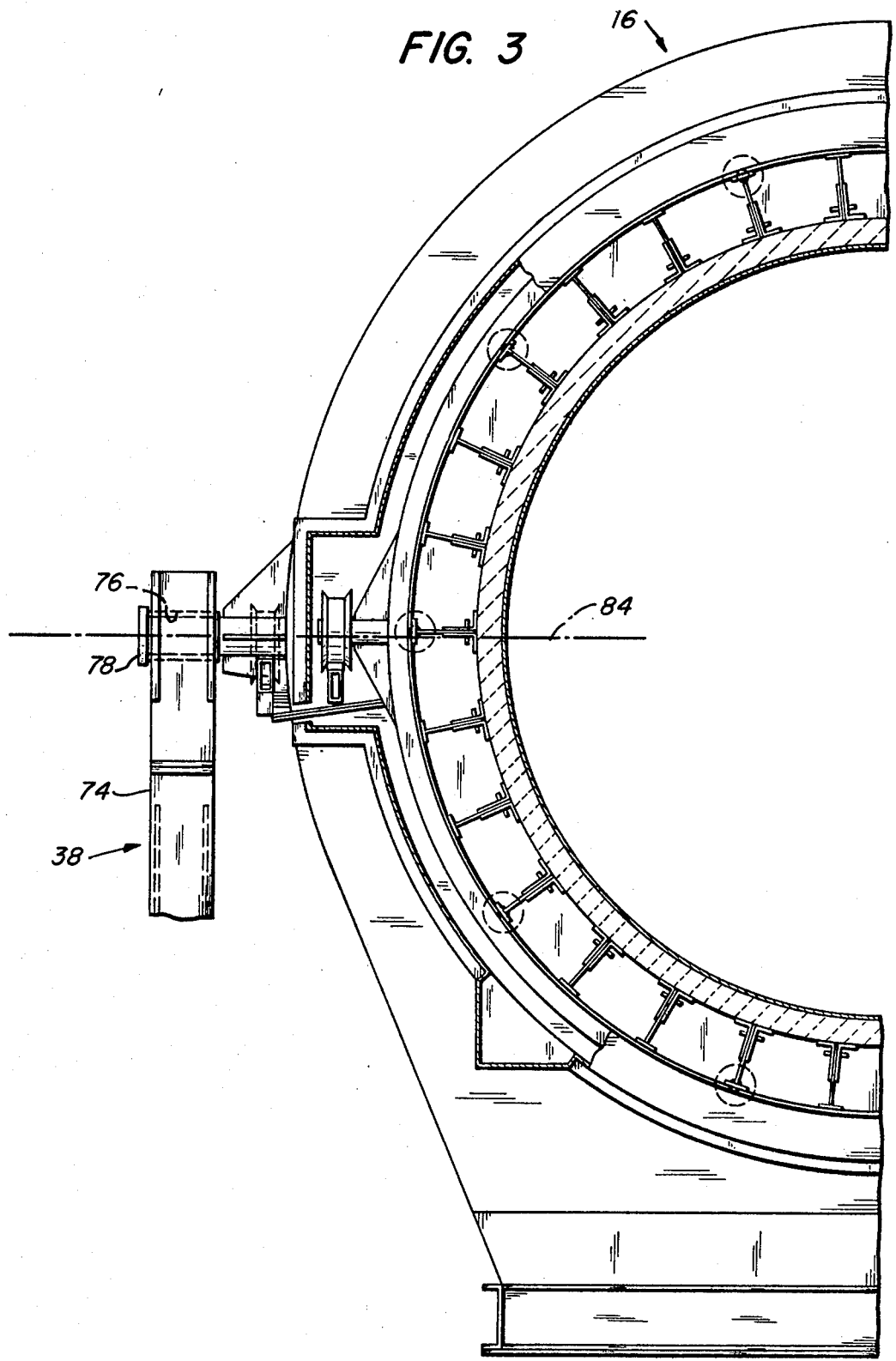

PIVOT ARRANGEMENT FOR A ROTARY DRUM ASSEMBLY

BACKGROUND OF THE INVENTION

1. Field of the Invention

This invention relates to a rotary drum assembly for forming an agglomerated product from agglomerative materials and more particularly to a rotary drum assembly having a pair of rotating drum members longitudinally aligned with the first drum member having an outlet end portion extending into the inlet portion of the second drum member and pivotally mounted relative thereto for adjusting the slope of the first drum member relative to the second drum member.

2. Description of the Prior Art

In the process of refining coal in the production of coking coal and formcoke, as described in U.S. Pat. Nos. 3,073,351; 3,401,089 and 3,562,783, particulate bituminous coal and finely divided char (the solid carbonaceous residue of coal which has been distilled at a temperature of between 800° and 1400° F) is introduced into a rotary drum. Depending on the type of coal employed in the ratio of coal to char, pitch may also be added as a binder and to increase the strength of the agglomerates formed in the process. The preheated coal and char supply as sensible heat substantially all the heat required to achieve the desired temperature for agglomerating the carbonaceous materials.

The materials are intimately mixed by rotation of the drum. As the constituents are mixed, the coal particles are further heated to such an extent that partial distillation of the coal particles occurs, evolving tar and forming a loosely coherent, plastic sticky mass in the rotary drum. Rotation of the drum breaks up the loosely coherent, plastic mass into relatively fine plastic particles which grow in size as a result of the rolling action of the plastic mass of particulate material in the drum.

During the mixing or ball forming stage the rate of flow of the agglomerative materials through the drum, the rotational speed of the drum and the inclination of the drum relative to the horizontal frame determine the size of the agglomerated product. The agglomerates will continue to grow as determined by these factors until the binder evolved by the coal particles and the pitch binder, if employed, loses its plasticity. Thereafter the agglomerates in the drum rigidify or harden to form uniformly sized particles that are discharged from the outlet portion of the drum. It is of primary importance that the agglomerated product formed be uniformly sized, preferably in the range of between ¾ to 2 inches. Agglomerates having a size greater than about 2 inches and less than about ¾ inches are considered unsuitable for use in a conventional blast furnace or other conventional metallurgical processes.

Rotary drums for agglomerating finely divided solid material are disclosed in U.S. Pat. Nos. 2,778,056; 2,695,221 and 1,921,114; British Pat. No. 779,302 and Canadian Pat. No. 627,037 in which a single drum is utilized to perform the steps of mixing, forming and hardening of the agglomerative materials to form the agglomerated product. The agglomerative materials are introduced into the inlet portion of the rotary drum by screw conveyors and an agglomerated product of a preselected size is discharged from the outlet portion of the rotary drum.

The forming stage and the hardening stage in the production of the agglomerated product require varying operating conditions. For example, during the forming stage the rotational speed of the drum should be greater than the rotation speed during the hardening stage in order to control the size of the agglomerated product. Principally, the size of the agglomerated product is controlled by the flow of the agglomerative materials through the rotary drum which, in turn, is controlled by the rate of rotation and the inclination of the drum with respect to the horizontal. Accordingly, the inclination of the drum during the forming stage should be shallower than the slope of the drum during the hardening stage. To provide these varying operating conditions with a single drum arrangement is not possible.

There is need for a rotary drum assembly in the forming of an agglomerated product from agglomerative material in which the rotational speed and angle of inclination of the rotary drum assembly may be adjusted during the agglomeration process.

SUMMARY OF THE INVENTION

In accordance with the present invention, there is provided a rotary drum assembly for forming an agglomerated product from agglomerative materials that includes a first cylindrical drum member having an inlet end portion for receiving the agglomerative materials and an outlet end portion for discharging the formed agglomerated product. A second cylindrical drum member has an inlet end portion for receiving the agglomerated product from the first drum member and a discharge end portion for discharging the agglomerated product. The first drum member outlet end portion extends into the inlet end portion of the second drum member. A pivotal support is operatively positioned relative to one of the drum members for pivotally supporting the drum member. A power actuated mechanism is operatively associated with the pivotally supported drum member and is operable to raise and lower the drum member relative to the other drum member and thereby control the rate of flow of the agglomerated materials through the drum member.

A pair of leg portions are secured to and extend upwardly from a platform assembly on opposite sides of the second drum member inlet portion. Transverse bores extend through the upper end portion of the leg portions. A pair of shaft members extend outwardly along an axis transverse to the longitudinal axis of the first drum member from a fixed center breech assembly that surrounds the adjacent end portions of the first and second drum members on the platform assembly. The shaft members are positioned in the transverse bores of the leg portions respectively.

The first drum member is positioned on the platform assembly so that the longitudinal axis thereof intersects the longitudinal axis of the second drum member at the transverse axis formed by the shaft members. In this manner, the platform assembly is arranged for pivotal movement about the shaft members at the intersection of the respective longitudinal axes. Pivotal movement of the platform assembly permits adjustments to be made in the inclination of the first drum member relative to the second drum member.

The platform assembly includes a frame member that is positioned longitudinally below the first drum member. A first fixed pad supports the frame member at the front end portion thereof adjacent the inlet of the first drum member. An extensible mechanism is provided that includes a plurality of jack devices that are positioned on the first fixed pad and are secured to the frame member. The jack devices are driven by a motor to raise and lower the front end of the frame member. A second fixed pad supports the center breech assembly and the opposite end portion of the frame member. The leg portions extend upwardly from the frame member and are pivotally secured to the center breech assembly which is mounted on the second fixed pad. With this arrangement, the outlet portion of the first drum member pivots about the shaft members at the center breech assembly to adjust the angle of inclination of the first drum member relative to the second drum member and thereby control the rate of flow of the agglomerative material through the first drum member.

Accordingly, the principal object of the present invention is to provide a rotary drum assembly for forming an agglomerated product from agglomerative materials that includes a first drum member in which the agglomerated product is formed and a second drum member that is longitudinally aligned and connected to the first drum member to permit adjusting the angle of inclination of the first drum member relative to the second drum member.

A further object of the present invention is to provide a rotary drum assembly for forming an agglomerated product that includes a first drum assembly for forming the product from agglomerative materials and a second drum member into which the agglomerated product of a preselected size is discharged with the drum members connected along the coplanar longitudinal axes thereof to permit a change in slope of the first drum member relative to the second drum member to thereby control the rate of flow of the agglomerative material through the rotary drum assembly.

These and other objects and advantages of this invention will be more completely disclosed and described in the following specification, the accompanying drawings and the appended claims.

BRIEF DESCRIPTION OF THE DRAWINGS

FIG. 3 is a fragmentary, partially sectional view in end elevation of the center breech assembly surrounding the outlet portion of the balling drum and the inlet portion of the hardening drum, illustrating the pivotal support for the balling drum outlet portion.

DESCRIPTION OF THE PREFERRED EMBODIMENT

Figure 1:
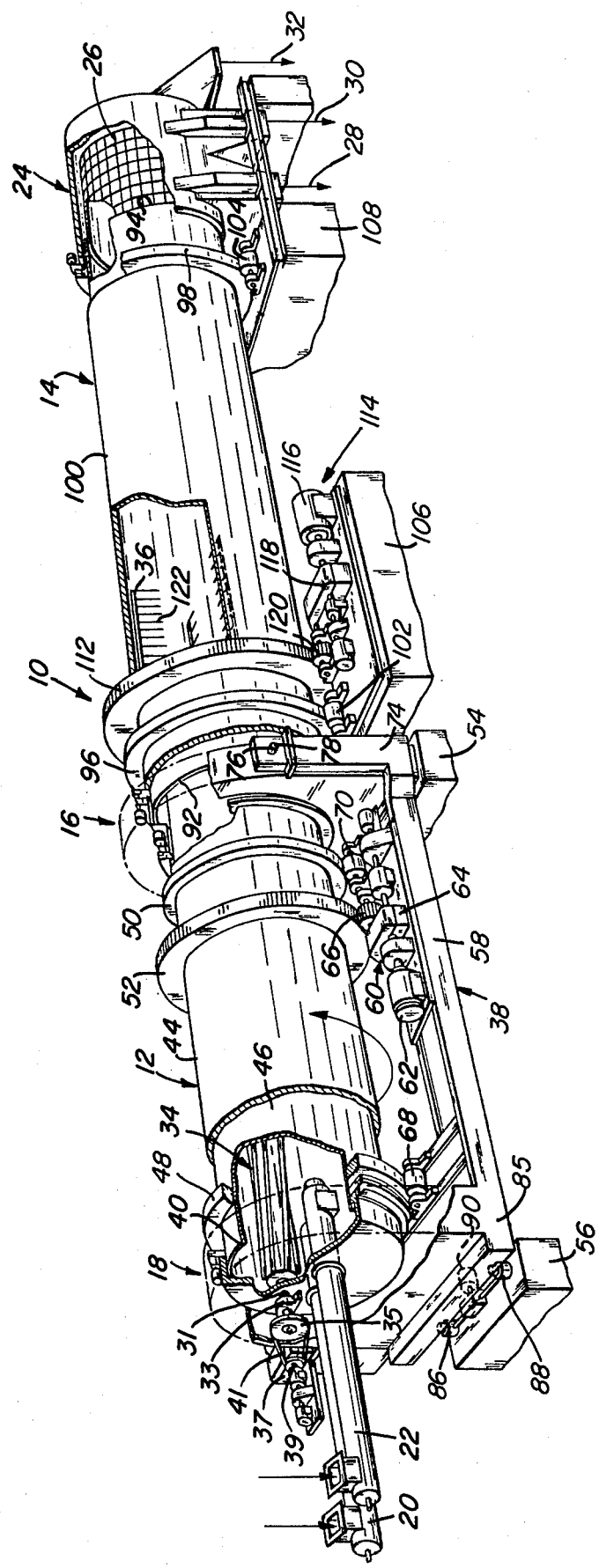
FIG. 1 is a perspective view of the rotary drum assembly that includes separate balling and hardening drums with portions broken away to illustrate the mechanical seals between the respective drums, the rotary scraper in the balling drum, the rakes in the hardening drum and the integral trommel screen.

Referring to the drawings and particularly FIG. 1, there is illustrated a rotary drum assembly generally designated by the numeral 10 that includes a balling drum 12 and a hardening drum 14. The balling drum 12 is longitudinally aligned with the hardening drum 14 and the balling drum 12 has its discharge portion extending into the inlet portion of the hardening drum. A center breech assembly 16 extends around the discharge end portion of the balling drum 12 and the inlet end of hardening drum 14 and provides a suitable seal for the respective drums to maintain a positive pressure within the drum assembly 10. A feed end breech assembly 18 surrounds the feed end of the balling drum 12 and also has suitable seals to maintain the positive pressure within the drum assembly 10.

A pair of feed screw conveyors 20 and 22 extend through suitable seals in the feed end breech 18 and are arranged to supply agglomerative material, such as coal and char, to the inner portion of the balling drum 12. The discharge end of the hardening drum 14 extends into a discharge end breech assembly 24 which also has suitable seal means to provide positive pressure within the drum assembly 10. A trommel screen 26 is secured to the discharge end of the hardening drum 14 and is positioned within the discharge breech assembly 24. The discharge breech assembly 24 has a plurality of outlets 28, 30 and 32 for the material agglomerated in the drum assembly 10. The agglomerated product having the desired size consist is arranged to be discharged from the drum assembly 10 through outlets 28 and 30 and the oversized product is discharged through outlet 32.

A rotary scraper assembly generally designated by the numeral 34 is supported within the balling drum 12 and is arranged to control the thickness of the agglomerative material deposited on the inner wall of the balling drum 12 and as described in co-pending application, Ser. No. 627,689 entitled "Method And Apparatus For Agglomerating Finely Divided Agglomerative Materials In A Rotating Drum," which application is assigned to the same assignee as the instant application and provides ridges and valleys within the balling drum 12 to aid in the mixing and agglomeration of the agglomerative material within balling drum 12.

Positioned within hardening drum 14 are a plurality of rakes 36 that extend radially therein and are arranged to assist in controlling the size consist of the agglomerated material that is rigidified within the hardening drum 14. Suitable drive means rotate the balling drum 12 and hardening drum 14 at different peripheral speeds and rotate the rotary scraper assembly 34 at a preselected speed.

The balling drum 12 is supported on a platform assembly generally designated by the numeral 38 that is pivotally secured at one end to the center breech assembly 16. The platform assembly 38 is arranged to change the angle of inclination of the balling drum 12 to thereby control the rate of flow of the agglomerative material through the balling drum 12. The balling and hardening drums 12 and 14 are so arranged that their longitudinal axes intersect at a location coincident with the pivot axis of the platform assembly 38 so that the platform pivots the balling drum 12 at the intersection of the balling drum and hardening drum axes.

With the above arrangement agglomerative material as, for example, particulate coal and finely divided char, previously heated to an elevated temperature is introduced through the conveyors 20 and 22 into the balling drum assembly 12. The preheated coal and char are arranged to supply as sensible heat substantially all of the heat required to achieve the desired temperature for agglomerating the carbonaceous materials. An inert atmosphere is maintained within the drum assembly 10 and a positive pressure of between one and three inches water is maintained within the drum assembly 10 by means of the seals provided at the breech assemblies 16, 18 and 24.

The balling drum 12 is rotated at a preselected speed to effect intimate mixing of the constituents and tumbling of the agglomerates as they are formed in the balling drum 12. As the constituents are admixed in the balling drum the coal particles are further heated to an extent that partial distillation of the coal particles occurs evolving tar and forming a loosely coherent, plastic sticky mass in the balling drum 12. Where desired, a pitch binder may also be supplied to the balling drum 12 to further contribute to the agglomeration of the carbonaceous material within the balling drum. The loosely coherent, plastic mass formed in the balling drum 12 breaks up during tumbling into relatively fine plastic particles. Growth of the plastic particles within the balling drum 12 is attained by a snowballing type of tumbling or rolling action on the upper exposed surface of the plastic mass of particulate material in the balling drum 12.

A portion of the plastic mass is deposited on the inner wall of the balling drum 12 and the rotary scraper 34 controls the thickness of the plastic mass so deposited and further forms ridges and valleys in the deposited material to improve the mixing and tumbling of the particles as they agglomerate. The rotary scraper 34 as illustrated in FIG. 1 has a front shaft 31 that is rotatably supported in a bearing 33 mounted on the feed end breech assembly 18. The front shaft 31 has a sprocket 35 nonrotatably secured thereto. A drive motor 37 is mounted adjacent to the feed end breech assembly and is connected through a suitable speed reducer to a drive sprocket 39. An endless chain 41 is reeved about the sprockets 35 and 39 to rotate the scraper 34 in a direction opposite to the direction of rotation of the drum 12.

The agglomerates so formed within the balling drum 12 continue to grow until the binder evolved by the coal particles and pitch, if employed, loses its plasticity. The agglomerates so formed are conveyed by the rotation of the balling drum 12 into the hardening drum 14. In the hardening drum 14 the remaining binder is evolved from the agglomerates and the agglomerates rigidify in the hardening drum 14 as substantially uniformly sized agglomerates.

The rotation of the hardening drum 14 conveys the rigidified agglomerates to the trommel screen 26 where agglomerates of a preselected size are discharged through the openings in the trommel screen and through outlets 28 and 30. The oversized agglomerates that do not pass through the openings in the trommel screen 26 are discharged through the opening 32. The oversized agglomerates may be crushed and recycled as a constituent of the feed introduced into the balling drum 12. The product of the preselected size recovered through outlets 28 and 30 is thereafter calcined in a calcining vessel at an elevated temperature of between 1500° F and 1800° F to form a formcoke that has strength and abrasion resistance that is equal or superior to that of conventional blast furnace coke.

Figure 2:
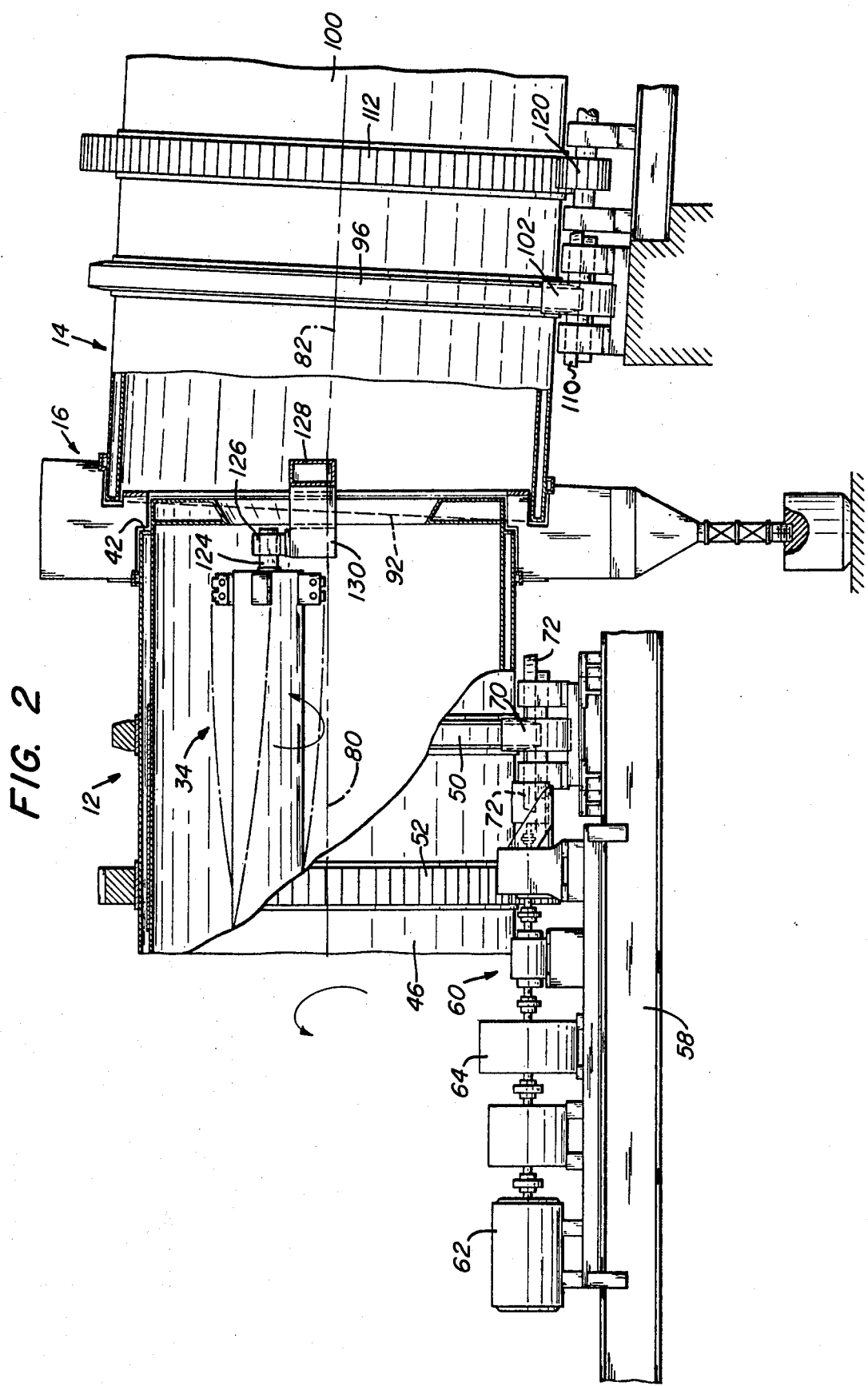
FIG. 2 is a fragmentary view in side elevation of the balling drum outlet portion and the hardening drum inlet portion, illustrating the manner in which the adjacent end portions of the respective drum members are connected and the end portion of the rotary scraper supported within the balling drum.

The balling drum 12 has a generally cylindrical configuration with an inlet end portion 40 and an outlet end portion 42 as illustrated in FIGS. 1 and 2. A suitable insulation material 44 may be positioned on the outer surface of the drum body portion 46 to reduce heat loss through the wall of the balling drum 12 during the agglomeration process. The balling drum 12 has a pair of steel tires or riding rings 48 and 50 adjacent the inlet end portion 40 and the discharge end portion 42. A drive ring gear 52 is secured to the outer surface of the balling drum 12 between the rings 48 and 50.

The center breech assembly 16 is supported on a fixed pad 54 and the front end of the platform 38 is supported on a second fixed pad 56. The platform assembly 38 includes a frame member 58 positioned beneath the balling drum 12. Mounted on the frame member 58 is a separate balling drum drive assembly generally designated by the numeral 60 that includes a drive motor 62, a reducer 64 and a pinion gear 66 that meshes with the drive ring gear 52. The riding rings 48 and 50 are supported on pairs of trunnion rollers 68 and 70 with suitable thrust wheels 72 abutting the sides of the ring 50, as illustrated in FIG. 2.

The platform assembly frame member 58 has a pair of upstanding leg portions 74; one of which is illustrated in detail in FIGS. 1 and 3. The upstanding leg portions have bores 76 therethrough adjacent the upper end portion. The center breech assembly 16 has a pair of trunnion shafts 78 extending outwardly therefrom through the bores 76 in frame member leg portions 74 to thus support that portion of the frame member 58 adjacent the balling drum discharge end portion 42. As is illustrated in FIG. 2, the longitudinal axis 80 of balling drum 12 intersects the longitudinal axis 82 of the hardening drum 14 at the axis 84 formed by the trunnion shafts 78 illustrated in FIG. 3 so that the balling drum support platform 38 pivots about the intersection of the axes 80 and 82.

The frame 58 has a front end portion 85 which is mounted on a plurality of jack devices 86 and 88 illustrated in FIG. 1. The jack devices 86 and 88 are supported on pad 56 and are arranged to be driven by a motor 90 to raise and lower the frame front end portion 85 and thus pivot the frame about the shafts 78 and adjust the slope of balling drum 12 relative to the hardening drum 14. It should be noted with this arrangement that the balling drum 12 pivots about the intersection of the axes 80 and 82 as previously described. Further in accordance with the practice of the present invention, the portion of the frame member 58 adjacent the balling drum inlet portion 40 may be pivotally connected to the feed end breech assembly 18 in a manner similar to the connection of the portion of the frame member 58 adjacent the balling drum outlet portion 42 to the center breech assembly 16. The jack devices would be employed to raise and lower the frame rear end portion about the pivotal connection of the frame front end portion to the balling drum inlet portion 40 and thereby adjust the slope of the balling drum 12 relative to the hardening drum 14.

The hardening drum 14 has a generally cylindrical configuration with an inlet end portion 92 and an outlet end portion 94. Although not illustrated in FIG. 1, the hardening drum body portion 100 has a suitable layer of insulation material secured thereto to reduce heat transfer therethrough during the agglomeration process. A pair of steel tires or annular rings 96 and 98 are secured to the hardening drum body portion 100 adjacent the inlet and outlet end portions. Pairs of trunnion rollers 102 and 104 are supported on fixed pads 106 and 108 and rotatably support the hardening drum 14. Thrust wheels 110 maintain the ring 96 in operative position on the trunnion rollers 102. The platforms 106 and 108 are so constructed to provide the desired angle of inclination for the hardening drum 14.

The hardening drum body portion 100 has a ring gear 112 secured thereto adjacent the ring 96. A hardening drum drive assembly generally designated by the numeral 114 is supported on the platform or pad 106 and includes a motor 116, a reducer 118 and a pinion gear 120 meshing with the ring gear 112. With this arrangement the hardening drum 14 may be rotated at a preselected speed that is independent of the speed of rotation of the balling drum 12. Secured to the inner wall of hardening drum body portion 100 are a plurality of rakes 36 that have inwardly extending tines 122. The rakes 36 extend longitudinally throughout a portion of the hardening drum 14 and are arranged as described in U.S. Pat. Nos. 3,628,012 and 3,460,196 to control the size consist of the agglomerates during the hardening process and before the agglomerates have rigidified.

As illustrated in FIG. 2, the rotary scraper 34 has a rear shaft 124 that is supported in a pillow block bearing 126 within the balling drum 12 adjacent the balling drum outlet portion 42. The pillow block bearing 126 is supported by a transverse beam member 128 that is positioned within the hardening drum 14 beyond the balling drum outlet end portion 42. It should be noted that the outer diameter of the balling drum 12 is smaller than the inner diameter of the hardening drum 14 so that the discharge end portion 42 of balling drum 12 extends into and beyond the inlet end portion 92 of hardening drum 14 to thereby facilitate the transfer of agglomerated particles from the balling drum 12 to the hardening drum 14 with a minimum of breakage of the fragile particles. The transverse beam member 128 has a forwardly extending portion 130 that extends into the rear discharge portion of balling drum 12, and the pillow block bearing 126 is secured to and supported on the forwardly extending portion 130. With this arrangement, the rear bearing 126 is positioned within the balling drum 12 and remains fixed when the slope of the balling drum 12 is adjusted relative to the hardening drum 14.

According to the provisions of the Patent Statutes, we have explained the principle, preferred construction and mode of operation of our invention and have illustrated and described what we now consider to represent its best embodiments. However, it should be understood that, within the scope of the appended claims, the invention may be practiced otherwise than as specifically illustrated and described.

We claim:

1. In a rotary drum assembly for forming an agglomerated product from agglomerative materials having,
    a first cylindrical drum member with an inlet portion for receiving the agglomerative materials and an outlet portion for discharging the formed agglomerated product,
    a feed end breech assembly enclosing and sealing said first cylindrical drum member inlet portion,
    a second cylindrical drum member with an inlet portion for receiving the agglomerated product from the first drum member and a discharge portion for discharging the agglomerated product,
    said first drum member outlet portion extending into said inlet portion of said second drum member,
    a center breech assembly surrounding and sealing said first drum member outlet portion and said second drum member inlet portion,
    a discharge end breech assembly surrounding and sealing said second cylindrical drum member discharge end portion, the improvement comprising;
    a platform assembly positioned below one of said drum members for pivotally and rotatably supporting said drum member,
    a pair of leg portions secured to and extending upwardly from said platform assembly on opposite sides of said drum member,
    bores extending transversely through said leg members,
    a pair of shaft members secured to said center breech assembly and extending outwardly therefrom along a transverse axis,
    said shaft members extending through said bores and pivotally supporting said platform assembly, and
    power actuated means operatively associated with said platform assembly for pivoting said platform assembly about said shaft members to thereby pivot drum member supported thereon relative to the other of said drum members and thereby control the rate of flow of the agglomerative materials through that drum member.

2. A rotary drum assembly for forming an agglomerated product from agglomerative materials as set forth in claim 1 which includes,
    said first and second drum members each having a longitudinal axis,
    said bores extending through said platform assembly leg members forming a transverse pivotal axis,
    said first drum member axis intersecting said second drum member axis,
    said axes intersecting at a location coincident with said transverse pivotal axis, and
    one of said drum members arranged to pivot about the intersection of said longitudinal axes on said transverse axis.

3. A rotary drum assembly for forming an agglomerated product from agglomerative materials as set forth in claim 1 which includes,
    a first fixed pad supporting said platform assembly adjacent the front end portion thereof,
    a second fixed pad supporting said center breech assembly at the rear end portion of said platform assembly, and
    said power actuated means being positioned on said first fixed pad and connected to said platform assembly to raise and lower the front end of said platform assembly.

4. A rotary drum assembly for forming an agglomerated product from agglomerative materials as set forth in claim 3 in which said power actuated means includes,
    extensible means positioned on said first fixed pad and connected to said platform assembly for vertically moving the front end of said platform assembly, and
    motor means drivingly connected to said power actuated means for actuating said extensible means to raise and lower the front end of said platform assembly and thereby pivot said drum member supported on said platform assembly relative to the other of said drum members.

* * * * *